A. F. FRISBY.
DEVICE FOR SUNNING AND AIRING BEDDING.
APPLICATION FILED NOV. 1, 1907.

1,002,510. Patented Sept. 5, 1911.

Witnesses:

Inventor:
Adeline F. Frisby
By F. D. Hardy Atty

UNITED STATES PATENT OFFICE.

ADDELINE F. FRISBY, OF CHICAGO, ILLINOIS.

DEVICE FOR SUNNING AND AIRING BEDDING.

1,002,510. Specification of Letters Patent. Patented Sept. 5, 1911.

Application filed November 1, 1907. Serial No. 400,261.

*To all whom it may concern:*

Be it known that I, ADDELINE F. FRISBY, a citizen of the United States, residing in Chicago, Illinois, have invented a certain new and useful Device for Sunning and Airing Bedding.

The object of my invention is to provide a better means for sunning and airing bedding, than the ordinary way of laying them on the lower part of a window when the lower sash is hoisted; to admit of the air and sun-light coming in contact with them. I accomplish such object in the manner shown in the accompanying drawing and described in the following specification.

Figure 1:
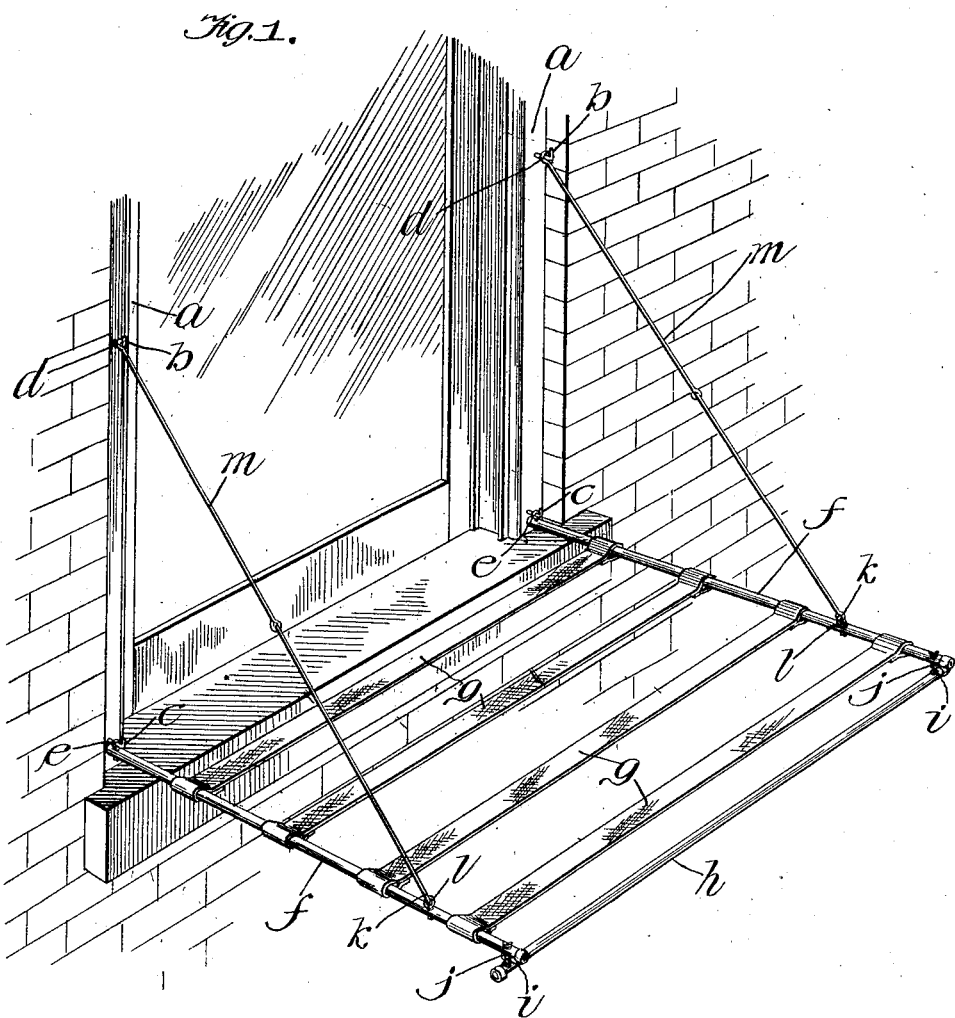
Figure 2:
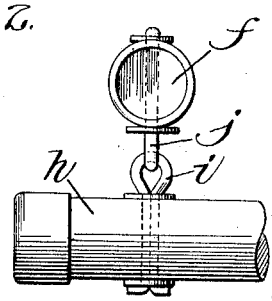

In the drawings—Figure 1 is a perspective view of my invention, shown attached to an ordinary window frame and in position to receive bedding to be aired and sunned. Fig. 2 is a detail of Fig. 1; showing more clearly the mode of connection at the outermost corners of my device.

In describing the drawings in detail like letters refer to like parts.

In Fig. 1—*a*—*a* are the sides of an ordinary window frame. *b*—*b* and *c*—*c* are threaded hooks screwed into the sides or casings *a*—*a*, to admit of attaching my device as shown. *d*—*d* are eyelets formed in the upper ends of the suspension rods *m*—*m* and passing over screw hooks *b*—*b*. *e*—*e* are rivet eyelets provided at the inner ends of the extension rods *f*—*f* and passing over the threaded hooks *c*—*c*. *f*—*f* are the extension rods. *g*—*g* are four canvas strips provided with loops or openings formed in their ends and passing over the extension rods *f*—*f* as shown. *h* is a parallel rod connecting the outer ends of the extension rods *f*—*f* by means of the rivet eyelets *i*—*i* and *j*—*j;* and thereby resisting any tendency of the extension rods *f*—*f* to collapse or come together when the weight of the bedding is thrown upon the canvas strips *g*—*g*. *m*—*m* are the suspension rods supporting the outer ends of the extension rods *f*—*f* by means of the eyelets *k*—*k* formed in the lower ends of the suspension rods *m*—*m* and connecting with the rivet eyelets *l*—*l* provided in the extension rod *f*—*f* and thereby forming the support for my device and the bedding when placed upon it to be aired and sunned.

Fig. 2, as hertofore stated, shows more clearly the mode, by means of the rivet eyelets *i*—*i* and *j*—*j*, of connecting the extension rods *f*—*f* with the parallel rod *h*.

Therefore supposing the lower sash of the window to be hoisted, it will readily be seen that the operator could place upon my device as shown, such bedding as was desired to be aired and sunned.

In constructing my device I prefer the construction shown and herein described. But I wish it expressly understood that I do not confine myself to the identical construction shown and herein described, as it is obvious that such changes may be made as come within the scope of the appended claim.

The rivet eyelets herein shown and described are preferable to rigid connections as they enable the operator to detach from a window and fold into a bundle my device when not in use.

Having fully described my invention, what I claim as new and desire to secure by Letters Patent is:

In a device of the class described, a support, a frame comprising side bars, canvas strips, each attached to the side bars intermediate the ends of said bars, eyelets, on the outer ends of the side bars, a cross bar provided with eyelets and connected to the side bars by respective engagement of the eyelets and means for detachably supporting the frame on said support.

ADDELINE F. FRISBY.

Witnesses:
HERMAN V. HIGGINS,
FRANKLIN D. HARDY.

Copies of this patent may be obtained for five cents each, by addressing the "Commissioner of Patents, Washington, D. C."